United States Patent [19]

Jarrett

[11] 4,246,110
[45] Jan. 20, 1981

[54] COMPENSATING DEVICE FOR FILTER CONTAMINANT INDICATING SYSTEM

[75] Inventor: Ronald T. Jarrett, West Burlington, Iowa

[73] Assignee: J. I. Case Company, Racine, Wis.

[21] Appl. No.: 92,822

[22] Filed: Nov. 9, 1979

[51] Int. Cl.³ .............................................. B01D 35/02
[52] U.S. Cl. ..................................... 210/90; 210/149; 116/220
[58] Field of Search ................. 210/90, 149, 541, 542; 116/70, 216, 220

[56] References Cited

U.S. PATENT DOCUMENTS

| | | | |
|---|---|---|---|
| 2,294,330 | 8/1942 | Clark | 210/149 |
| 3,646,906 | 3/1972 | Hammer | 210/90 X |
| 4,033,870 | 7/1977 | Parquet et al. | 210/149 X |
| 4,172,971 | 10/1979 | Silverwater | 210/90 X |

Primary Examiner—John Adde
Attorney, Agent, or Firm—Cullen, Sloman, Cantor, Grauer, Scott & Rutherford

[57] ABSTRACT

A temperature compensating device is disclosed for use in a filter contaminant warning system in a tractor or similar machine. The temperature compensating device is hydraulically connected between the hydraulic filter element inlet and the pressure responsive filter contaminant indicator switch in the warning system. Pressurized fluid from the inlet side of the filter element enters the temperature compensating device through an elongated capillary, and the fluid is discharged simultaneously through a port to the filter contaminant indicator switch and through an orifice to a reservoir. When the fluid is cold and has high viscosity, a substantial part of the total fluid pressure drop between the filter inlet and indicator switch occurs in the capillary portion of the compensating device. The remaining portion of the pressure loss occurs in the orifice. After the fluid temperature has increased, thereby reducing viscosity, the major part of the pressure drop between the filter inlet and indicator switch occurs in the orifice, and the remaining part of the pressure loss occurs in the capillary. The compensating device reduces the pressure at the indicating switch when the fluid is highly viscous or cold and increases the pressure at the switch when the fluid is less viscous. Thus, the temperature compensating device prevents the warning system from switching on falsely due to fluid viscosity changes when a filter restriction does not exist.

3 Claims, 4 Drawing Figures

COMPENSATING DEVICE FOR FILTER CONTAMINANT INDICATING SYSTEM

BACKGROUND OF THE INVENTION

The present invention relates to a filter contaminant indicating system, and more particularly, to a temperature compensating device for use in a warning system which indicates when a hydraulic filter element should be changed because of contamination.

Tractors and similar types of machinery have plural hydraulic systems, and because of the environments in which they work, it is important to have the oil filtered and to know that the filters are clean and operative. A contaminated oil filter reduces the efficiency of the machine operation by restricting the flow of oil. Thus, it is important that the oil filter be functional for its intended use while permitting the maximum flow of fluid.

It is conventional to provide a device which automatically operates in response to a clogged hydraulic filter. Examples of prior art constructions are found in U.S. Pat. Nos. 2,879,892 and 3,482,696 which disclose warning lamps that are automatically operated in response to a clogged filter condition. Another prior art construction shown in U.S. Pat. No. 4,033,870, assigned to the assignee of the present invention, provides for the oil to be directed by a valve to one or more oil filters incorporated in the system, depending on the filter that becomes clogged. The latter system also provides a warning light which is activated to notify the operator that a filter is clogged and needs changing.

A problem with these prior constructions is that the indicator switch being used in present detecting systems is responsive to the pressure at the inlet to the filter, and no provision is made for changes in fluid viscosity as the fluid temperature increases. The warning light is on at colder temperatures because of increased fluid viscosity even though the filter may not be clogged. When the oil temperature increases and the fluid becomes less viscous, the warning light goes out. However, as the filter gradually becomes clogged because of contaminants, the temperature of the oil at which the light goes out correspondingly becomes higher. Thus, the operator must make a decision to change the filter based upon past observations as to the oil temperature at which the warning light went out. If different operators use the same machine, one or more of the operators may not know the oil temperature at which the warning light usually goes out, and the filter may be changed prematurely or after it becomes very clogged which defeats the purpose of a warning system.

The disadvantages of present filter restriction indicating systems have resulted in the temperature compensating device of the present invention which makes the warning system accurate in indicating when a hydraulic filter element should be changed because of contamination.

SUMMARY OF THE INVENTION

In accordance with the present invention, a temperature compensating device is disclosed for use in a filter contaminant warning system in a tractor or similar machine.

The temperature compensating device of the present invention is hydraulically connected between the hydraulic oil filter inlet and the pressure responsive indicator switch in the warning system. Hydraulic fluid from the inlet side of the filter element enter the temperature compensating device through an elongated capillary, and the fluid is discharged simultaneously through a port to the filter contaminant indicator switch and through an orifice to a reservoir. The compensating device includes a T-shaped body wherein the capillary forms the long leg of the "T" and the switch port and orifice forms the short leg.

When the hydraulic fluid is cold (i.e., highly viscous), a substantial part of the total fluid pressure drop between the filter inlet and indicator switch occurs in the capillary portion of the compensating device. The remaining portion of the pressure loss occurs in the orifice. Thus, the capillary reduces the pressure at the indicator switch when the fluid is cold so that the system does not falsely switch on the warning light when a filter restriction does not, in fact, exist.

After the fluid has increased in temperature, the major portion of the pressure drop between the filter inlet and indicator switch occurs in the orifice and the remaining part of the pressure loss occurs in the capillary. The orifice, which is downstream from the indicator switch to return fluid to the reservoir, is less sensitive to viscosity changes than the capillary. Under these conditions, the pressure at the indicator switch when the fluid is heated is greater than the pressure at the switch when the fluid is cold or more viscous. The compensating device is intended to reduce the pressure at the indicating switch when the fluid is cold (i.e., highly viscous) and increase the pressure at the switch when the fluid is hot (i.e., low viscosity). Thus, if the filter restriction is such that the warning light comes on when the fluid is viscous, then it will stay on at higher fluid temperatures even though the viscosity decreases.

Other advantages and meritorious features of the high temperature compensating device of the present invention will be more fully understood from the following description of the preferred embodiment, the appended claims, and the drawings, a brief description of which follows.

DESCRIPTION OF THE PREFERRED EMBODIMENT

Figure 1:
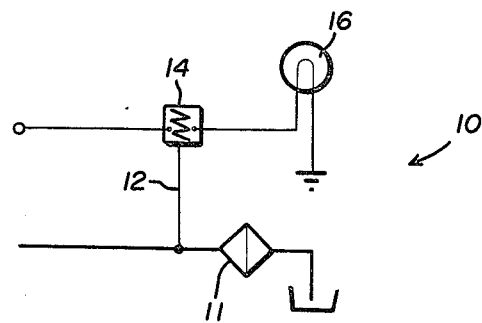
FIG. 1 is a schematic illustration of a conventional filter restriction warning system.
Figure 3:
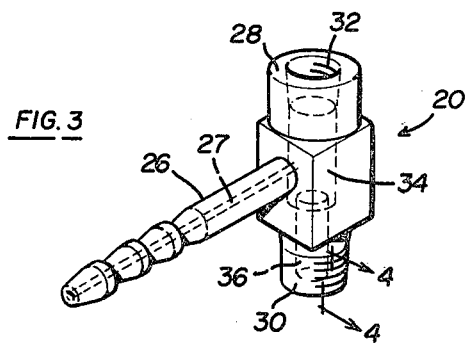
FIG. 3 is a perspective view of the temperature compensating device of the present invention.
Figure 4:
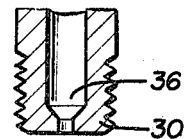
FIG. 4 is a cross-sectional view taken along line 4—4 in FIG. 3.
Figure 2:
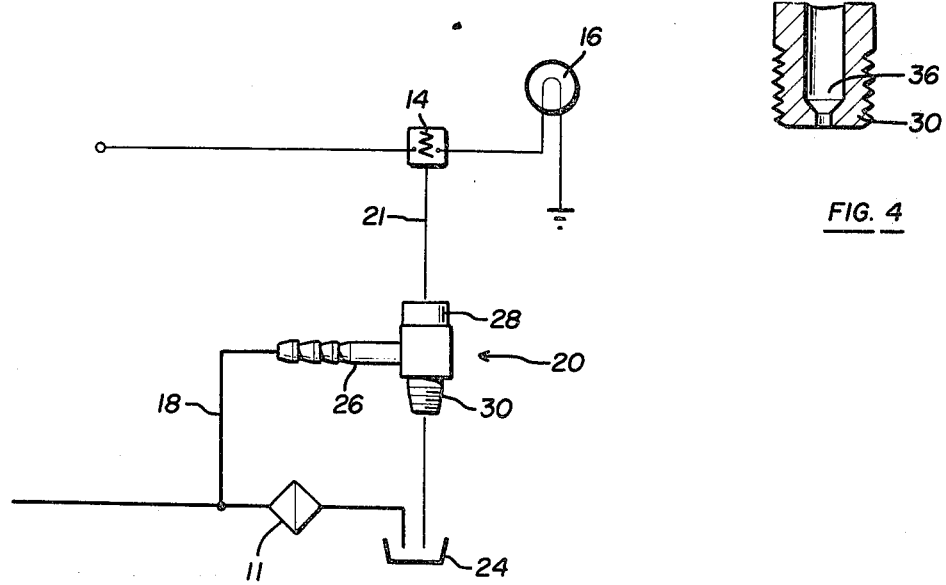
FIG. 2 is a schematic illustration of a filter restriction warning system incorporating the temperature compensating device of the present invention.

A preferred embodiment of the temperature compensating device of the present invention is illustrated in FIGS. 2-4. FIG. 1 illustrates a conventional warning system which indicates when a hydraulic filter element should be changed because of contamination. Referring to FIG. 1, the inlet to filter element 11 is hydraulically connected by conduit 12 to filter indicator switch 14. A pre-determined pressure level at switch 14 causes warning indicator light 16 to come on thereby indicating that the hydraulic filter element 11 should be changed because of contamination.

A problem with the warning system 10 illustrated in FIG. 1 is that the warning light switch 14 is responsive to the inlet pressure to the filter 12. Warning light 16 is on at colder temperatures because of increased fluid viscosity even though filter 11 is not, in fact, clogged. When the fluid temperature increases and becomes less viscous, the warning light 16 goes out. As the flow of fluid through the filter is hindered because of contaminants, the temperature of the fluid at which the light goes out correspondingly becomes higher. Thus, the operator has no accurate way of determining when to change filter 11.

In accordance with the present invention, as disclosed in FIGS. 2–4, temperature compensating device 20 is hydraulically connected between the filter inlet and the indicator switch 14. Hydraulic fluid from the inlet side of the filter enters compensating device 20 through conduit 18. The fluid passes through elongated capillary 27 in leg 26, and it is discharged through port 32 in leg 28 to indicator switch 14 via conduit 21. Simultaneously therewith, fluid is discharged through orifice 36 in leg 30 to reservoir 24 via conduit 22.

The compensating device 20 is formed as a T-shaped body comprised of elongated capillary leg 27 which is perpendicular to the short leg formed from port portion 28 and orifice portion 30. Fluid passing through capillary 27 is discharged perpendicularly into cylindrical portion 34 which is located within the body of compensating device 20 between port 32 and orifice 36.

When the fluid is cold (i.e., highly viscous), a substantial portion of the total pressure drop between the filter inlet and indicator switch 14 occurs in the capillary 27 of the compensating device 20. The remaining portion of the pressure loss occurs in orifice 36. Thus, the capillary 27 reduces the pressure seen by the indicator switch 14 when the hydraulic fluid is cold so that the system does not falsely switch on the warning light 16 when a filter restriction does not, in fact, exist.

After the fluid has increased in temperature, the major portion of the pressure drop between the filter inlet and indicator switch 14 occurs in orifice 36, and the remaining part of the pressure loss occurs in capillary 27. Orifice 36, which is downstream of indicator switch 14 to return fluid to reservoir 24, is less sensitive to viscosity changes than capillary 27. The pressure at the indicator switch for fluid having a higher temperature is greater than the pressure at the indicator switch when the fluid is cold or more viscous.

The operation of temperature compensating device 20 is illustrated by the following example. When the hydraulic fluid is cold and viscous (i.e., 20° F.), the filter indicator switch 14 sees a pressure equal to approximately 40% of the inlet pressure at the filter element because a pressure loss of approximately 60% occurs across capillary 27. At a fluid temperature of 80° F., the pressure drop between the filter inlet and indicator switch is approximately 35%. After the fluid temperature has increased to 180° F., the major part of the pressure drop between filter 11 and switch 14 occurs in orifice 36, which is downstream of switch 14. Switch 14 sees approximately 85% of the filter inlet pressure at 180° F. because capillary 27 only causes a pressure loss of approximately 15% at the elevated temperature.

The compensating device 20 is intended to reduce the pressure at the indicator switch 14 when the fluid is highly viscous or cold and increase the pressure at the switch when the fluid is less viscous or hot. Thus, if a filter restriction is such that the warning light 16 comes on when the fluid is viscous, then it will stay on at higher fluid temperatures even though the viscosity decreases.

It will be apparent to those skilled in the art that the foregoing disclosure is exemplary in nature rather than limiting, the invention being limited only the the appended claims.

I claim:

1. In a filter contaminant indicator system, a filter element hydraulically connected at its inlet end to a pressure responsive indicator switch, said switch being electrically connected to a warning lamp for actuating said lamp and thereby indicating that the flow of hydraulic fluid through said filter element is restricted, the improvement comprising:

a compensating device hydraulically connected between said filter inlet and said indicator switch;

said compensating device including a capillary, a switch port, and an orifice, said capillary being connected to said inlet end of said filter, said switch port being connected to said indicator switch, and said orifice being connected to a reservoir; and pressurized fluid from said filter entering said capillary and being discharged through said switch port and said orifice, a substantial fluid pressure drop occuring in said compensating device when said fluid is highly viscous or cold thereby reducing the pressure at the indicator switch to prevent said switch from switching on said warning lamp when a filter restriction does not exist, and a small pressure drop occuring in said compensating device when said fluid is less viscous or heated whereby the pressure at the indicator switch for heated fluid is greater than the pressure at the indicator switch for cold fluid.

2. The filter contaminant indicator system as defined in claim 1 wherein said compensating device comprises a generally T-shaped body, said capillary being elongated and forming one leg of said T-shaped body, said elongated capillary leg being generally perpendicular to said switch port and said orifice.

3. The filter contaminant indicator system as defined in claim 2 wherein said T-shaped body includes a cylindrical chamber which connects said switch port and said orifice, the discharge end of said capillary being connected to said cylindrical chamber.

* * * * *